US010611979B2

United States Patent
Diloyan et al.

(10) Patent No.: US 10,611,979 B2
(45) Date of Patent: *Apr. 7, 2020

(54) WATER BASED NANOPARTICLE DISPERION

(71) Applicant: NANOTECH INDUSTRIAL SOLUTIONS, INC., Avenel, NJ (US)

(72) Inventors: George Diloyan, Cranford, NJ (US); Girija S. Chaubey, Avenel, NJ (US); Debapriya Das, Hoboken, NJ (US)

(73) Assignee: NANOTECH INDUSTRIAL SOLUTIONS, INC., Avenel, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/067,959

(22) PCT Filed: Jan. 4, 2017

(86) PCT No.: PCT/US2017/012154
§ 371 (c)(1),
(2) Date: Jul. 3, 2018

(87) PCT Pub. No.: WO2017/120207
PCT Pub. Date: Jul. 13, 2017

(65) Prior Publication Data
US 2019/0112540 A1    Apr. 18, 2019

Related U.S. Application Data

(60) Provisional application No. 62/274,933, filed on Jan. 5, 2016.

(51) Int. Cl.
*C10M 173/02* (2006.01)
*C10M 103/06* (2006.01)
(Continued)

(52) U.S. Cl.
CPC ......... *C10M 103/06* (2013.01); *C01B 19/007* (2013.01); *C01G 39/06* (2013.01);
(Continued)

(58) Field of Classification Search
CPC ............ C10M 173/02; C10M 2201/06; C10N 2250/12; C10N 2240/40
See application file for complete search history.

(56) References Cited

U.S. PATENT DOCUMENTS 5,116,521 A    5/1992 Fujii et al.
6,217,843 B1    4/2001 Homyonfer et al.
(Continued)

OTHER PUBLICATIONS

International Search Report issued in International Application No. PCT/US17/12154, dated May 25, 2017, pp. 1-3.
(Continued)

*Primary Examiner* — Ellen M McAvoy
(74) *Attorney, Agent, or Firm* — Tutunjian & Bitetto, P.C.

(57) ABSTRACT

A water based dispersion that includes lubricating nanoparticles. The lubricating nanoparticles can be provided by at least one intercalation nanoparticle of a metal chalcogenide in dispersion with the water base. The at least one intercalation nanoparticle may have a geometry that is fullerene-like, tubular-like structure or be substantially spherical or the intercalation nanoparticles may include particles have each of the aforementioned geometries. The intercalation nanoparticle is surface treated with a dispersant that is water soluble and includes a polar functional group.

11 Claims, 9 Drawing Sheets

(51) Int. Cl.
  C10M 105/08   (2006.01)
  C10M 105/56   (2006.01)
  C01G 41/00    (2006.01)
  C01G 39/06    (2006.01)
  C01B 19/00    (2006.01)
  C10M 105/14   (2006.01)
  C10M 105/58   (2006.01)
  C10M 105/74   (2006.01)
  B82Y 40/00    (2011.01)
  B82Y 30/00    (2011.01)

(52) U.S. Cl.
  CPC .......... *C01G 41/00* (2013.01); *C10M 105/08* (2013.01); *C10M 105/14* (2013.01); *C10M 105/56* (2013.01); *C10M 105/58* (2013.01); *C10M 105/74* (2013.01); *C10M 173/02* (2013.01); *B82Y 30/00* (2013.01); *B82Y 40/00* (2013.01); *C01P 2004/64* (2013.01); *C10M 2201/062* (2013.01); *C10M 2201/065* (2013.01); *C10M 2201/066* (2013.01); *C10M 2215/042* (2013.01); *C10M 2223/04* (2013.01); *C10N 2210/01* (2013.01); *C10N 2210/02* (2013.01); *C10N 2210/04* (2013.01); *C10N 2210/05* (2013.01); *C10N 2210/06* (2013.01); *C10N 2210/07* (2013.01); *C10N 2210/08* (2013.01); *C10N 2220/082* (2013.01); *C10N 2230/06* (2013.01)

(56) References Cited

U.S. PATENT DOCUMENTS

| | | | |
|---|---|---|---|
| 8,476,206 B1 * | 7/2013 | Malshe | C10M 141/00 |
| | | | 508/498 |
| 9,446,965 B2 * | 9/2016 | Kverel | C01G 1/02 |
| 2008/0234149 A1 * | 9/2008 | Malshe | C10M 141/10 |
| | | | 508/150 |
| 2010/0172823 A1 | 7/2010 | Tenne et al. | |
| 2010/0227782 A1 * | 9/2010 | Tenne | B82Y 30/00 |
| | | | 508/165 |
| 2013/0109601 A1 | 5/2013 | Tenne et al. | |
| 2014/0158931 A1 * | 6/2014 | Poncelet | C01F 7/02 |
| | | | 252/75 |
| 2014/0235513 A1 * | 8/2014 | Kverel | C10M 125/22 |
| | | | 508/103 |
| 2015/0087624 A1 * | 3/2015 | Baba | A61K 9/10 |
| | | | 514/180 |
| 2016/0046501 A1 * | 2/2016 | Kverel | C01G 1/02 |
| | | | 428/404 |
| 2016/0075965 A1 * | 3/2016 | Bouffet | C10M 141/06 |
| | | | 508/168 |
| 2017/0009171 A1 * | 1/2017 | Soto-Castillo | C10M 125/22 |
| 2017/0073612 A1 * | 3/2017 | Thiebaut | C10M 141/12 |
| 2017/0166691 A1 * | 6/2017 | Lellouche | C08G 61/126 |
| 2017/0213615 A1 * | 7/2017 | Okada | B22F 9/24 |
| 2018/0002191 A1 * | 1/2018 | Sandford | C01G 51/04 |
| 2018/0079989 A1 * | 3/2018 | Liang | C10M 173/02 |

OTHER PUBLICATIONS

Supplementary European Search Report issued in EP Application No. 17736238, dated Jun. 6, 2019, pp. 1-8.
GU, Y. et al., "Preparation and Tribological Properties of Dual-Coated TiO 2 Nanoparticles as Water-Based Lubricant Additives" Journal of Nanomaterials (Jan. 2014) pp. 1-9, vol. 2014.
XP002791858, Database Week 201552 (Apr. 2015), abstract, pp. 1-2.
XP002791859, Database Week 201554 (May 2015), abstract, pp. 1-3.
Margolin, A. et al., "Inorganic fullerene-like nanoparticles of TiS2" Chemical Physics Letters (Aug. 2005) pp. 162-166, vol. 411.
Hou, X. et al., "Microstructures and tribological properties of PEEK-based nanocomposite coatings incorporating norganic fullerene-like nanoparticles" Surface & Coating Technology (Feb. 2008) pp. 2287-2291, vol. 202.

* cited by examiner

WATER BASED NANOPARTICLE DISPERION

CROSS REFERENCE TO RELATED APPLICATION

This application claims the benefit of U.S. Provisional Application No. 62/274,933 filed Jan. 5, 2016 titled "Water Based Nanoparticle Dispersion", which is incorporated herein in its entirety by reference.

BACKGROUND

Technical Field

The present disclosure relates to water based nanoparticle dispersions, and in some embodiments relates to water based or water soluble (fully or partly) lubricants used in applications, such as metal working, hydraulic oil etc.

Description of the Related Art

Metalworking fluid (MWF) is the name given to a range of oils and other liquids that are used to cool and/or lubricate metal work pieces when they are being machined, ground, milled, etc. MWFs reduce the heat and friction between the cutting tool and the work piece, and help prevent burning and smoking. Applying MWFs also helps improve the quality of the work piece by continuously removing the fines, chips, and swarfs (Swarfs are the small pieces of metal removed from a work piece by a cutting tool) from the tool being used and the surface of the work piece.

SUMMARY OF THE INVENTION

In one embodiment, a water based nanoparticle dispersion is provided that includes a water base and at least one intercalation nanoparticle of a metal chalcogenide in dispersion. The intercalation nanoparticle is surface treated with at least one dispersant that is at fully or partially soluble in water and includes a polar functional group. The intercalation nanoparticle may have a geometry that is a platelet shaped geometry, a spherical shaped geometry, a near spherical shaped geometry, a multi-layered fullerene-like geometry, a tubular-like geometry or a combination thereof.

In some embodiments, the metal chalcogenide intercalation nanoparticles are composed of a metal chalcogenide having molecular formula MX, where M is a metallic element selected from the group consisting of titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Hg) and combinations thereof, and X is a chalcogen element selected from the group consisting of sulfur (S), selenium (Se), tellurium (Te), oxygen (O) and combinations thereof. Some examples of metal chalcogenide intercalation compounds can include tungsten disulfide ($WS_2$) and molybdenum disulfide ($MoS_2$). The intercalation compound is present in the dispersion in an amount of greater than 0.1 wt %.

In some embodiments, the dispersant/surfactant that functionalizes the outer layer of the multi-layered fullerene-like nanostructure or near spherical like nanostructure is an ethoxylated phosphate ester, such as polyoxyethylene nonylphenyl ether phosphate, polyethylene glycol branched nonylphenyl ether phosphates, polyoxyethylene tridecyl phosphate ester, complex alkyl phosphate ester, or a combination thereof. In another embodiment, the dispersant/surfactant that functionalizes the outer layer of the multi-layered fullerene-like nanostructure or near spherical geometry nanoparticle is an isopropanol amine, such as diisopropanolamine, triisopropanolamine, monoisopropanolamine and combinations thereof. In another embodiment, the dispersant/surfactant that functionalizes the outer layer of the multi-layered fullerene-like nanostructure or near spherical geometry nanoparticle is an alkylalkonolamine compound such as, dimethylethanolamine, N-methyldiethanolamine, monomethylethanolamine, butylethanolamine, aminomethylpropanol, bis-(hydroxyethyl) methylamine, N,N-dimethyl-2-(2-aminoethoxy)-ethanol and combinations thereof. In another embodiment, the dispersant/surfactant that functionalizes the outer layer of the multilayered fullerene-like nanostructure or near spherical geometry nanoparticle is an ethanolamine, such as monoethanolamine, diethanolamine, triethanolamine and combination thereof.

The fullerene-like nanostructure can also be functionalized with dispersing agent consisting polar group of thiols and organic acid such as 11-mercaptoundecanoic acid, organic polysiloxane, sodium oleate soap, triethanolamine oleate, fatty alcohol polyethylene glycol ether, polyethylene glycol octyl phenyl ether, diol such as 5-decyne-4,7-diol, 2,4,7,9-tetramethyl. The surfactants can be ionic, anionic, cationic and/or nonionic, copolymers, polymers, monomers and combinations thereof.

In some embodiments, the industrial lubricant may be employed as a metal working fluid, cooling fluid, drilling mud, gear oil (hygroscopic), hydraulic oil (hygroscopic), turbine oil (hygroscopic), fire extinguishing liquids, semiconductor materials or a combination thereof.

In another aspect the present disclosure provides a method of metal working using a working fluid as described above. The metal working method may include providing a metal substrate, and applying an industrial lubricant to the metal substrate. The industrial lubricant composition may include a water base and at least one intercalation compound of a metal chalcogenide in dispersion, wherein the intercalation compound is surface treated with a dispersant that is at least partially soluble in water and includes a polar functional group. The metal substrate may be a preformed blank shape for threading, a metal sheet, a metal plate, or a combination thereof. The intercalation compound can have a multi-layered fullerene-like geometry, a tubular-like geometry, spherical geometry, near spherical geometry, or a combination thereof. Following the application of the industrial lubricant to the metal substrate, the metal substrate may be worked. Working may include cutting, chip, burning, drilling turning, milling, grinding, sawing, threading, filing, drawing, forming, necking, stamping, planning, rabbeting, routing, broaching or a combination thereof.

In yet another aspect, a method of producing a water based dispersion including at least one intercalation nanoparticle of a metal chalcogenide. The intercalation nanoparticle may have a geometry that is a platelet shaped geometry, a spherical shaped geometry, a near spherical shaped geometry, a multi-layered fullerene-like geometry, a tubular-like geometry or a combination thereof. In some embodiments, forming the dispersion may include mixing a dispersant with the water base, wherein the dispersant is at least partially soluble in water and includes a polar functional group. Intercalation nanoparticle of a metal chalcogenide having a fullerene-like geometry, a tubular-like geometry, spherical shaped geometry, near spherical shaped geometry, or a combination thereof is then added to the mixture of the water base and the dispersant, and mixed to provide that the dispersant reacts and encapsulates with the outer layers of the intercalation nanoparticle to provide that the intercalation nanoparticles have a surface charged which creates a repulsive force between adjacent particles and maintains inter-particle distance that substantially eliminates agglomeration of the intercalation nanoparticles in the dispersion.

BRIEF DESCRIPTION OF THE DRAWINGS

The following detailed description, given by way of example and not intended to limit the disclosure solely thereto, will best be appreciated in conjunction with the accompanying drawings, wherein like reference numerals denote like elements and parts, in which.

DETAILED DESCRIPTION OF THE PREFERRED EMBODIMENTS

Figure 1:
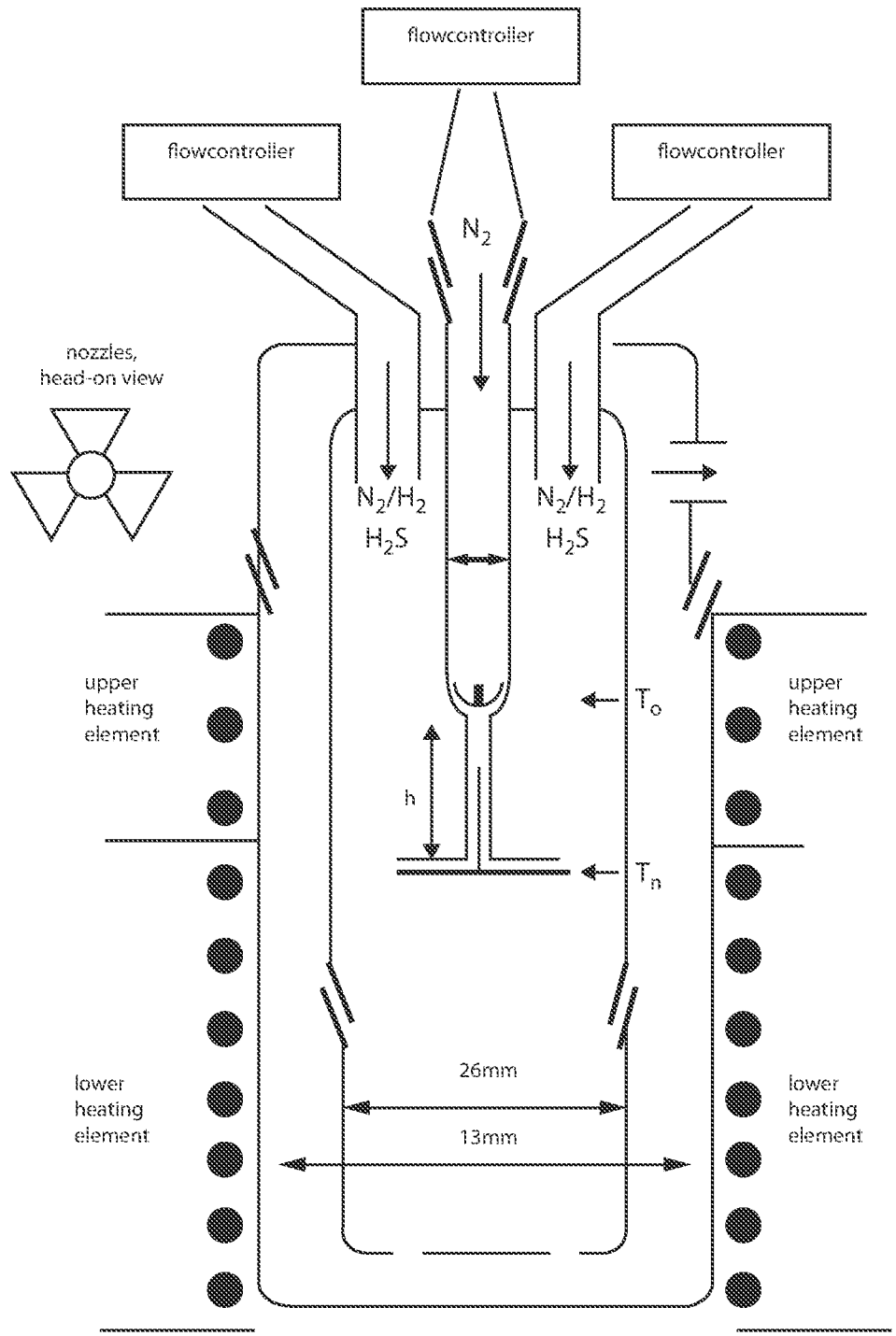
FIG. 1 is a schematic view illustrating one embodiment of chemical reactor for forming some examples of metal chalcogenide intercalation compounds, such as fullerene-like nanoparticles, in accordance with one embodiment of the present disclosure.

Detailed embodiments of the present disclosure are described herein; however, it is to be understood that the disclosed embodiments are merely illustrative of the compositions, structures and methods of the disclosure that may be embodied in various forms. In addition, each of the examples given in connection with the various embodiments are intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the compositions, structures and methods disclosed herein. References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment.

In one embodiment, an industrial lubricant composition is provided that includes an water base and at least one intercalation nanoparticle of a metal chalcogenide in dispersion, wherein the intercalation nanoparticle is surface treated with a dispersant that is at least partially water soluble, which in some embodiments is fully water soluble, and includes a polar functional group. The intercalation nanoparticle may have a geometry that is a platelet shaped geometry, a spherical shaped geometry, a near spherical shaped geometry, a multi-layered fullerene-like geometry, a tubular-like geometry or a combination thereof.

The intercalation nanoparticle of the water based dispersion has at least some lubricating properties. For example, the industrial lubricant may be suitable for a metal working fluid, a drilling mud, a gear oil (hygroscopic), hydraulic oil (hygroscopic), turbine oil (hygroscopic), machine oil (hygroscopic), light machine oil (hygroscopic) and combinations thereof. In some embodiments, the compositions disclosed herein may also be suitable for cooling fluids and semiconductor materials.

The industrial lubricant composition disclosed herein is water based. The term "water based" as used herein denotes that the lubricant composition includes water as a medium/ solvent. For example, water may be the main ingredient of the industrial lubricant compositions disclosed herein. In some embodiments, the compositions may include greater than 50 wt. % water. In other embodiments, the compositions may include greater than 75 wt. % water. In further embodiments, the compositions of the present disclosure may include greater than 90 wt. % water. In some examples, the water component of the water based lubricant composition that is disclosed herein may be equal to 90 wt. %, 91 wt. %, 92 wt. %, 93 wt. %, 94 wt. %, 95 wt. %, 95.25 wt. %, 95.5 wt. %, 95.75 wt. %, 96 wt. %, 96.25 wt. %, 96.5 wt. %, 96.75 wt. %, 97 wt. %, 97.25 wt. %, 97.5 wt. %, 97.75 wt. %, 98 wt. %, 98.25 wt. %, 98.5 wt. %, 98.75 wt. %, 99 wt. %, 99.25 wt. %, 99.50 wt. %. 99.75 wt. %, 99.8 wt. %, 99.85 wt. %, 99.875 wt. % and 99.9 wt %, and any value between the aforementioned values, as well as any range including an upper limit value and a maximum limit value provided by any of the above examples.

In some embodiments, the industrial lubricant is a colloidal dispersion, which is a heterogeneous system which is made up of dispersed phase and dispersion medium. In the colloidal dispersion of the present disclosure one substance is dispersed as nanoscale particles, i.e., intercalation nanoparticle of a metal chalcogenide, in another substance called the dispersion medium, i.e., water based liquid medium.

In some embodiments, the industrial lubricant has reacted with a dispersant on the surface of the intercalation nanoparticle, wherein the tail of the surface reacted intercalation nanoparticle may be hydrophilic. The industrial lubricants disclosed herein include a dispersant that reacts with the nanoscale particles i.e., intercalation nanoparticle of a metal chalcogenide, creating a surface charge that acts as a repulsive force with respect to adjacent nanoparticles i.e., adjacent intercalation nanoparticle of a metal chalcogenide. For example, the dispersant may act as a surfactant to adjust the charge of the outer layer of the dispersed nanoscale particles i.e., intercalation nanoparticle of a metal chalcogenide. For example, the dispersant may produce a negative charge on the outer surface layer of the intercalation nanoparticle of a metal chalcogenide, e.g., tungsten disulfide $WS_2$ fullerene like layered nanoparticles. If each of the nanoscale particles i.e., intercalation nanoparticle of a metal chalcogenide, had the same electrostatic charge, the nanoscale particles i.e., intercalation nanoparticle of a metal chalcogenide, would be repulsed from one another. The repulsive force maintains the dispersion of the nanoparticles in solution by obstructing agglomeration so that a nanoscale dimension is maintained for the dispersed nanoscale particles, i.e., dispersed intercalation nanoparticle of a metal chalcogenide.

The intercalation nanoparticle may be composed of a metal chalcogenide having molecular formula MX, where M is a metallic element selected from the group consisting of titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Hg) and combinations thereof, and X is a chalcogen element selected from the group consisting of sulfur (S), selenium (Se), tellurium (Te), oxygen (O) and combinations thereof. The intercalation nanoparticle typically has a fullerene-like or tube-like geometry or spherical/near spherical geometry, but may also have a platelet like geometry. The intercalation nanoparticle may have a geometry that is a platelet shaped geometry, a spherical shaped geometry, a near spherical shaped geometry, a multi-layered fullerene-like geometry, a tubular-like geometry or a combination thereof. Some examples of metal chalcogenide intercalation nanoparticles can include tungsten disulfide ($WS_2$) and molybdenum disulfide ($MoS_2$).

As used herein, the term "fullerene-like" denotes a substantially spherical geometry. In some instances, the fullerene-like structures may be perfectly spherical, i.e., having the form of a sphere. The spherical nature of the metal chalcogenide fullerene-like structures provided herein is distinguished from metal chalcogenide nanostructures that may be oblong, oval (e.g., open ended oval), football shaped, columnar shaped, plate-like shaped, or any irregularly shaped particle that deviates from being spherical which typically results from a method of reducing particle size physically, such as milling of particles from the macro and micron scale to the nanometer scale. Or the milling of particles from a larger nanoscale size to a less nanoscale size.

The spherical nature of the metal chalcogenide composition fullerene-like structures provided by the present disclosure results from being synthesized within the Nano-sized regime using chemical methods. For example, synthesis of inorganic fullerene-like molybdenum disulfide (IF-$MoS_2$) may be based upon the sulfidization of amorphous $MO_3$, e.g., $MO_3$ thin films, in a reducing atmosphere at elevated temperatures (e.g., ~850° C.). It is noted, that the metal chalcogenide IFs, such as IF-$MoS_2$, can also be synthesized using high-temperature methods that occur above 650° C. These methods typically involve such techniques as growth from gas phase, e.g., in which $MoO_3$ in the vapor phase is reached with $H_2S$ in a carrier, as employed in the apparatus depicted in FIG. 1. One embodiment, of the process that may be consistent with the apparatus depicted in FIG. 1 includes the use of $MoO_3$ powder placed in the inner part of the reactor (a) which can be heated to a temperature of approximately 780° C. Molecular clusters $(MoO_3)_3$ can be formed and carried down through the reactor by $N_2$ gas. Hydrogen gas diffuses through the nozzles (c) from the outer reactor (b) and starts to react with the molecular clusters. The mild reduction conditions yield reduced $MoO_3$ clusters, which are less volatile, and form $MoO_3$ nanosize particles at the low part of (a). The suboxide nanoparticles reach a size less than 5 nm before the sulfidization step. The coated oxide nanoparticles are swept by the carrier gas outside the reactor (a). Because the nanoparticles are surface-passivated, they land on the ceramic filter (d) and the oxide-to-sulfide conversion continues within the core without coalescence of the nanoparticles. The gas-phase reactor synthesis process generates pure IF-$MoS_2$ phase, and can control the size and shape of the nanoparticles. In other embodiments, inorganic materials having the metal chalcogenide composition, e.g., $WS_2$, and the fullerene-like geometry and/or tubular-like geometry may be produced via sulfidization of tungsten oxide nanoparticles in reduction atmosphere in fluidized bed reactor.

The inorganic materials having the metal chalcogenide composition and the fullerene-like geometry and/or tubular-like geometry, i.e., intercalation nanoparticles, may also be formed in accordance with at least one of the methods disclosed in U.S. Patent Application Publication No. 2006/0120947, U.S. Pat. Nos. 7,524,481, 6,217,843, 7,641,869, U.S. Patent Application Publication No. 2010/0172823, U.S. Pat. Nos. 6,710,020, 6,841,142, 7,018,606, 8,513,364, 8,329,138, 7,959,891, 7,018,606, U.S. Patent Application Publication No. 2013/0109601, U.S. Patent Application Publication No. 2010/0227782 and U.S. Pat. No. 7,641,886, which are each incorporated herein in their entirety. The inorganic materials having the metal chalcogenide composition and the fullerene-like geometry and/or tubular-like geometry, i.e., intercalation nanoparticles, formed using the methods within the scope of the above provided description can have a very small particle size distribution. It is noted that the methods disclosed in the aforementioned patents are only some examples of methods that are suitable for forming the inorganic materials having the metal chalcogenide composition and the fullerene-like and/or tubular-like geometry and/or spherical and near spherical geometry. Any method may be employed for forming the above-described inorganic materials having the metal chalcogenide composition, so long as the compound formed has a fullerene-like and/or tubular-like geometry.

It is noted that the intercalation nanoparticles have at least one dimension in the nanoscale range, which is what the term "nanoparticle" denotes. For example, when the intercalation nanoparticles have a spherical geometry there diameter may be of a nanoscale. In other examples, in which the intercalation nanoparticles are not spherical, e.g., nanotubes, while one dimension is in the nanoscale it is possible that at least a second dimension is greater than the nanoscale. For example, the term "nanoscale" denotes less than 250 nm. A dimension greater than 250 nm can be referred to as being of "sub-microscale". In some embodiments, the nanoscale dimension of the intercalation nanoparticles is less than 100 nm. For example, in some embodiments, the nanoscale dimension of the intercalation nanoparticles may be equal to 1 nm, 2 nm, 5 nm, 10 nm, 15 nm, 20 nm, 25 nm, 30 nm, 35 nm, 40 nm, 45 nm, 50 nm, 55 nm, 60 nm, 65 nm, 70 nm, 75 nm, 80 nm, 85 nm, 97 nm, 99 nm and 100 nm, and any value between the aforementioned values, as well as any range including an upper limit value and a maximum limit value provided by any of the above examples. It is noted that these dimensions are suitable for describing the intercalation nanoparticles as present in the water based dispersion. As noted above, the dispersant applied to the intercalation nanoparticles produces a surface charge that obstructs agglomeration.

Figure 2:
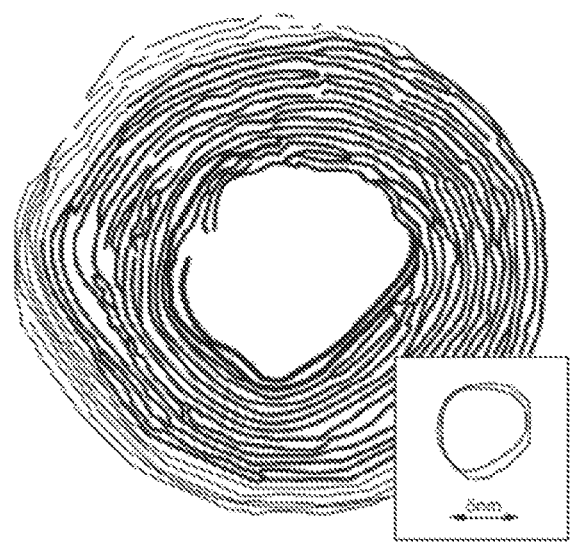
FIG. 2 is a transmission electron microscope (TEM) images of a metal chalcogenide intercalation compound having a molecular formula $MX_2$ and a fullerene-like geometry that is spherical, in accordance with one embodiment of the present disclosure.
Figure 3:
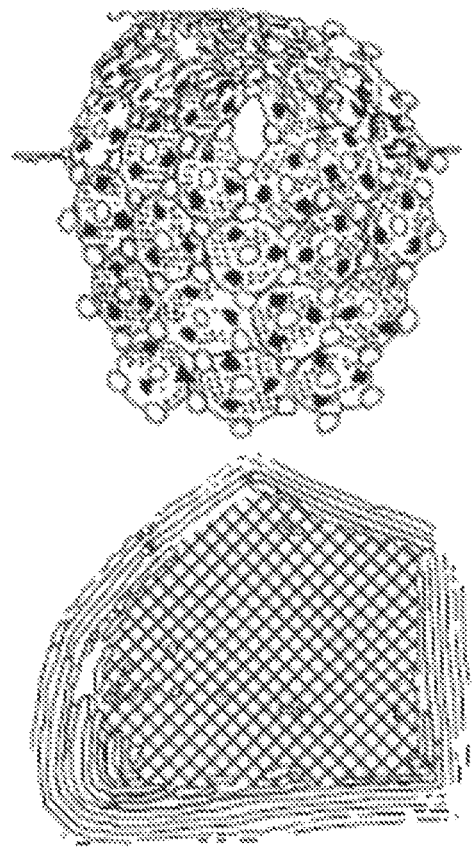
FIG. 3 is an illustration of the chemical structure of a fullerene-like $MoS_2$ nanoparticle, in accordance with one embodiment of the present disclosure.

A characteristic image of inorganic fullerene (IF) nanoparticle, i.e., intercalation nanoparticle, produced in the gas-phase reactor that has been described above is illustrated in FIGS. 2 and 3. FIG. 2 depicts one embodiment of a fullerene-like structures may be perfectly spherical, in accordance with the present disclosure. FIG. 3 is an illustration of the chemical structure of a fullerene-like MoS$_2$ nanoparticle, which is a cage like spherical geometry of molybdenum identified by black circles and sulfur identified by white circles. FIG. 3 illustrates that the inorganic metal chalcogenide, i.e., intercalation nanoparticles, having the caged substantially spherical structure is similar to the caged structure of carbon 60 illustrating a fullerene like arrangement. As discussed above, the fullerene-like structures of metal chalcogenide, i.e., intercalation nanoparticles, may be perfectly spherical. The particles obtained by the present disclosure can have a more perfect spherical shape, than those obtained using methods other than those disclosed herein. This stems from the fact that, according to some embodiments of the present disclosure, the reaction takes place in the gas phase, where an isotropic environment for the reaction prevails. Consequently, much larger oxide nanoparticles could be converted into inorganic fullerene when they flow in the gas stream.

The core of the fullerene-like geometry for some embodiments of the intercalation nanoparticles may be hollow, solid, amorphous, or a combination of hollow, solid and amorphous portions. A fullerene like geometry may also be referred to as having a cage geometry. In one example, an inorganic material having the metal chalcogenide composition with a fullerene like geometry may be a cage geometry that is hollow at its core and layered at is periphery. In another example, an inorganic material having the metal chalcogenide composition with a fullerene like geometry may be a cage geometry that is solid at its core and layered at is periphery. For example, the inorganic material having the metal chalcogenide composition and the fullerene like geometry may be a single layer or double layered structure. The inorganic material having the metal chalcogenide composition and the fullerene like geometry is not limited on only single layer or double layered structures, as the inorganic material may have any number of layers. For example, the metal chalcogenide composition, i.e., intercalation nanoparticles, may be layered to include 5 layers to 100 layers of metal chalcogenide material that can exfoliate from the particle. In another embodiment, the metal chalcogenide composition may be layered to include 10 layers to 50 layers of metal chalcogenide material that can exfoliate from the particle. In yet another embodiment, the metal chalcogenide composition may be layered to include 15 layers to 20 layers of metal chalcogenide material that can exfoliate from the particle. These structures are also referred to in the art as being "nested layer structures".

One example of an inorganic material having the metal chalcogenide composition and the fullerene like geometry fullerene-like geometry is depicted in FIGS. 2-3. FIG. 2 depicts a transmission electron microscope (TEM) image of an inorganic material having a tungsten disulfide (WS$_2$) composition with a fullerene-like geometry. In another example, the inorganic material having the metal chalcogenide composition and the inorganic fullerene like geometry is composed of molybdenum disulfide (MoS$_2$). It is noted that the inorganic material with the fullerene-like geometry that is depicted in FIG. 2 is not limited to only tungsten disulfide (WS$_2$) and molybdenum disulfide (MoS$_2$). Inorganic materials with a metal chalcogenide composition and having a fullerene-like geometry may have any inorganic composition that meets the formula MX$_2$, where M is a metallic element selected from the group consisting of titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Rg) and combinations thereof, and X is a chalcogen element selected from the group consisting of sulfur (S), selenium (Se), tellurium (Te), oxygen (O) and combinations thereof.

The inorganic material having the metal chalcogenide composition and fullerene-like geometry that can provide the intercalation nanoparticles may have a diameter ranging from 1 nm to 15 microns. In another embodiment, the inorganic material having the metal chalcogenide composition and the fullerene-like geometry may have a diameter ranging from 2 nm to 10 microns. In yet another embodiment, the inorganic material having the metal chalcogenide composition and the fullerene-like geometry may have a diameter ranging from 5 nm to 5 microns. The inorganic material having the metal chalcogenide composition and the fullerene-like geometry may have a diameter that is any value within the above ranges. It is noted that the above dimensions are provided for illustrative purposes only, and are not intended to limit the present disclosure. In some embodiments, most of the nanoparticles will have diameters ranging between 20 nm to 500 nm, and even more typically will have diameters between 30 nm to 200 nm. In one example, the inorganic material having the metal chalcogenide composition and the fullerene-like geometry may have a diameter ranging from 5 nm to 999 nm.

The component of the coating that is provided by the inorganic material of the metal chalcogenide composition may also have tubular-like geometry. As used herein, the term "tubular-like geometry" denotes a columnar or cylindrical geometry, in which one axis of the intercalation compound. In some embodiments, an inorganic material having the metal chalcogenide composition and the tubular-like geometry may be a cage geometry that is hollow at its core and layered at its periphery. In other embodiments, an inorganic material having the metal chalcogenide composition and the tubular-like geometry may be a cage geometry that is solid at its core, and/or amorphous at its core, and layered at its periphery. For example, the inorganic material having the metal chalcogenide composition and the tubular-like geometry may be a single layer or double layered structure. These structures are also referred to in the art as being "nested layer structures". The number of layers in the inorganic material having the metal chalcogenide composition and the tubular-like geometry may be similar to the number of layers in the inorganic material having the metal chalcogenide composition and the fullerene-like geometry. In some examples, the minimum number of layers for the inorganic material having the tubular-like geometry is approximately 2 layers.

Figure 4:
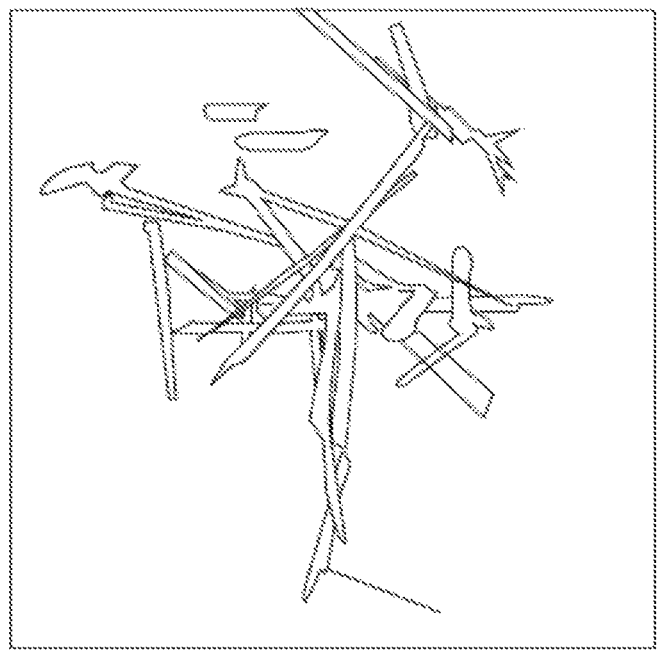
FIG. 4 is a transmission electron microscope (TEM) image of a metal chalcogenide intercalation compound having a molecular formula $MX_2$ and a tubular-like geometry, in accordance with one embodiment of the present disclosure.

One example of an inorganic material having the metal chalcogenide composition and the tubular-like geometry is depicted in FIG. 4. FIG. 4 depicts a transmission electron microscope (TEM) image of an intercalation compound having a tungsten disulfide ($WS_2$) composition with an inorganic tubular-like geometry. In another example, the inorganic material having the metal chalcogenide composition and the tubular-like geometry is composed of molybdenum disulfide ($MoS_2$). It is noted that the inorganic material having the metal chalcogenide composition and the tubular-like geometry that is depicted in FIG. 4 is not limited to only tungsten disulfide ($WS_2$) and molybdenum disulfide ($MoS_2$). Inorganic materials having a tubular-like geometry may have any inorganic composition that meets the formula $MX_2$, where M is a metallic element selected from the group consisting of titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Hg), and combinations thereof, and X is a chalcogen element selected from the group consisting of sulfur (S), selenium (Se), tellurium (Te) and oxygen (O).

The inorganic materials, i.e., intercalation nanoparticles, having the metal chalcogenide composition and the tubular-like geometry may have a diameter, i.e., distance perpendicular to the greatest axis of the tubular-like geometry, ranging from 1 nm to 300 nm. In another embodiment, the inorganic materials having the metal chalcogenide composition and the tubular-like geometry may have a diameter ranging from 5 nm to 125 nm. In yet another embodiment, the inorganic materials have the metal chalcogenide composition and the tubular-like geometry with a diameter ranging from 10 nm to 100 nm. The inorganic materials having the metal chalcogenide composition and the tubular-like geometry may have a length, i.e., greatest axis of the tubular-like geometry, that ranges from 1 nm to 20 cm. In another embodiment, the inorganic materials having the metal chalcogenide composition and the tubular-like geometry may have a length, i.e., greatest axis of the tubular-like geometry, that ranges from 5 nm to 15 cm. In yet another embodiment, the inorganic materials having the metal chalcogenide composition and the tubular-like geometry may have a length, i.e., greatest axis of the tubular-like geometry, that ranges from 100 nm to 10 cm. The inorganic materials having the metal chalcogenide composition and the tubular-like geometry may have a length or diameter that is any value within the above ranges. It is noted that the above dimensions are provided for illustrative purposes only, and are not intended to limit the present disclosure.

Figure 5:
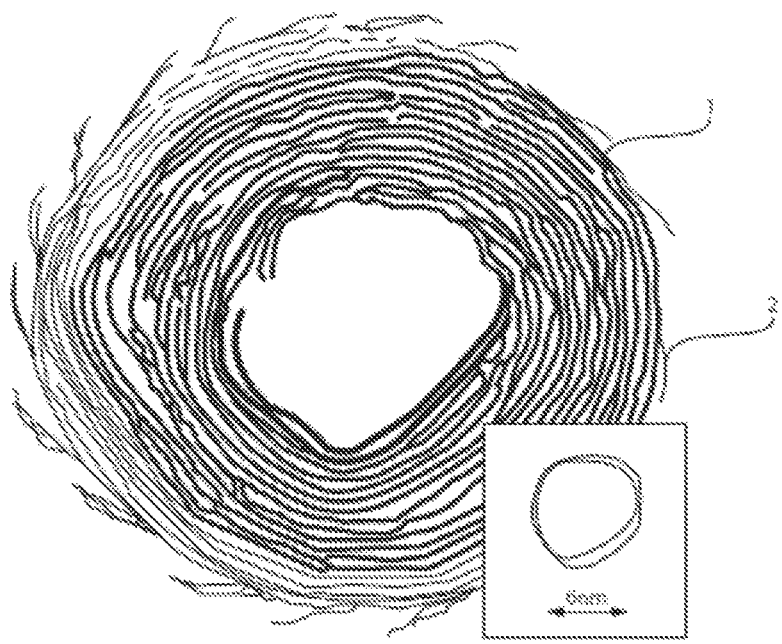
FIG. 5 is a transmission electron microscope (TEM) images of a metal chalcogenide intercalation compound having a molecular formula $MX_2$ and a fullerene-like geometry, wherein an outer layer of the multi-layered fullerene-like geometry is of nanoparticle dimension and comprises at least one sectioned portion, in which the sectioned portion may extend along a direction away from the curvature of nanoparticle, in accordance with one embodiment of the present disclosure.

FIG. 5 depicts a metal chalcogenide intercalation compound, i.e., intercalation nanoparticle, having a molecular formula $MX_2$ and a fullerene-like geometry, wherein an outer layer of the multi-layered fullerene-like geometry is of nanoparticle dimension and comprises at least one sectioned portion 2, in which the sectioned portion 2 may extend along a direction away from the curvature of nanoparticle. FIG. 5 depicts one embodiment of a intercalation nanoparticle provided by a multi-layered fullerene-like nanostructure comprising a plurality of layers 1 each comprised of an metal chalcogenide composition has a molecular formula of $MX_2$, where M is a metallic element selected from the group consisting of titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Hg) and combinations thereof, and X is a chalcogen element selected from the group consisting of sulfur (S), selenium (Se), tellurium (Te), oxygen (O) and combinations thereof. Two example compositions for the structure depicted in FIG. 5 include $MoS_2$ and $WS_2$. An outer layer of the multi-layered fullerene-like structure comprises at least one sectioned portion 2. The at least one sectioned portion 2 extends along a direction away from the curvature of the multi-layered fullerene-like nanostructure. The at least one sectioned portion 2 is engaged to remaining section of the outer layer.

The multi-layered fullerene-like nano-structure, i.e., intercalation nanoparticles, can be substantially spherical, and in some instances may include layers that are perfectly spherical. The core of the multi-layered fullerene-like nano-structure having the sectioned outer layer may be hollow, solid, amorphous, or a combination of hollow, solid and amorphous portions. In some embodiments, the at least one sectioned portion 2 that extends along a direction away from the curvature of the multi-layered fullerene-like nano-structure extends along a direction that is tangent to the curvature surface of the multi-layered fullerene-like nano-structure. The at least one sectioned portion 2 that extends along a direction away from the curvature of the multi-layered fullerene-like nano-structure may extends along a direction that can be close to being substantially normal to the curvature surface of the multi-layered fullerene-like nano-structure.

The inorganic material, i.e., intercalation nanoparticles, having the metal chalcogenide composition and the fullerene like geometry with the sectioned outer layer is not limited on only single layer or double layered structures, as the inorganic material may have any number of layers. For example, the metal chalcogenide composition may be layered to include 5 layers to 100 layers of metal chalcogenide material that can exfoliate from the particle. In another embodiment, the metal chalcogenide composition may be layered to include 10 layers to 50 layers of metal chalcogenide material that can exfoliate from the particle. In yet another embodiment, the metal chalcogenide composition may be layered to include 15 layers to 20 layers of metal chalcogenide material that can exfoliate from the particle. These structures are also referred to in the art as being "nested layer structures".

The inorganic material having the metal chalcogenide composition and fullerene-like geometry, i.e., intercalation nanoparticles, with sectioned outer layer as depicted in FIG. 5 may have a diameter ranging from 1 nm to 15 microns. In another embodiment, the inorganic material having the metal chalcogenide composition and the fullerene-like geometry may have a diameter ranging from 2 nm to 10 microns. In yet another embodiment, the inorganic material having the metal chalcogenide composition and the fullerene-like geometry with sectioned outer layer, as depicted in FIG. 5, may have a diameter ranging from 5 nm to 5 microns. The inorganic material having the metal chalcogenide composition and the fullerene-like geometry may have a diameter that is any value within the above ranges. It is noted that the above dimensions are provided for illustrative purposes only, and are not intended to limit the present disclosure. In some embodiments, most of the nanoparticles will have diameters ranging between 10 nm to 500 nm, and even more typically will have diameters between 30 nm to 200 nm. In one example, the inorganic material having the metal chalcogenide composition and the fullerene-like geometry with sectioned outer layer may have a diameter ranging from 5 nm to 999 nm.

The sectioned portions of the outer layer may be present around an entire outer surface of the substantially spherical nanoparticle. The outer layer including the plurality of sectioned portions comprises dangled bonds that provide a charged surface of the outer layer of the multi-layered fullerene-like nano-structure. In one embodiment, the section portions 2 of the outer layer have a length ranging from 1% to 80% of a diameter of the multi-layered fullerene-like nano-structure, e.g., 1% to 70% of the multi-layered fullerene-like nano-structure.

The multi-layered fullerene-like structure comprises at least one sectioned portion that is depicted in FIG. 5 may be formed beginning with the multilayered fullerene like structures that are formed using the methods described above for forming the substantially spherical fullerene-like. Beginning with a multi-layered fullerene-like structure that does not include a sectioned outer layer, a force is applied to open up sections in the outer layer, which peels a portion of the outer layer from the curvature of the multi-layered fullerene-like structure. The force may be applied using any means to apply a physical force to the particles, such as milling, e.g., dry and/or wet milling, sonification, ultrasonication, and combinations thereof. The time and force is dependent upon the degree of sectioning preferred in the outer layer.

Figure 6:
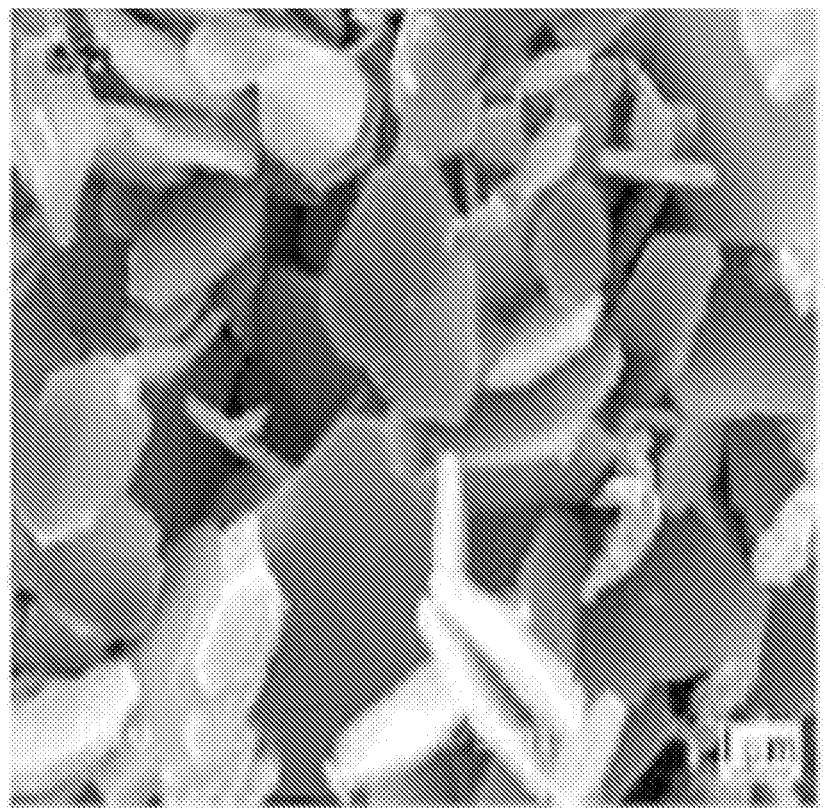
FIG. 6 is a transmission electron microscope (TEM) image of a metal chalcogenide having a molecular formula $MX_2$ and a platelet like geometry, in accordance with one embodiment of the present disclosure.

In addition to the above describe fullerene like and tubular like structures, the intercalation nanoparticle of metal chalcogenide that is employed in the industrial lubricant may also have a platelet like geometry. The term "platelet like" denotes a disc like shape that has a thickness dimension (z-direction) that is substantially less than the width (x-direction) and height dimension (y-direction). FIG. 6 is a transmission electron microscope (TEM) image of a metal chalcogenide having a molecular formula $MX_2$ and a platelet like geometry. In some examples, the metal chalcogenide having the platelet like geometry is composed of tungsten disulfide ($WS_2$) and/or molybdenum disulfide ($MoS_2$). It is noted that the inorganic material having the metal chalcogenide composition and the plate-like geometry that is depicted in FIG. 6 is not limited to only tungsten disulfide ($WS_2$) and molybdenum disulfide ($MoS_2$). Inorganic materials having a tubular-like geometry may have any inorganic composition that meets the formula $MX_2$, where M is a metallic element selected from the group consisting of titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Hg), and combinations thereof, and X is a chalcogen element selected from the group consisting of sulfur(S), selenium (Se), tellurium (Te) and oxygen (O). In some examples, when the intercalation compound is a nanoparticles having a platelet geometry, the platelet may have a width ranging from 5 nm to 990 nm, and a height ranging from 5 nm to 990 nm. In another example, when the intercalation compound is a microscale particle, the platelet geometry may have a width ranging from 0.1 micron to 5 microns, a height ranging from 0.1 micron to 5 microns, and may have a thickness ranging from 5 nm to 200 nm.

The intercalation nanoparticles, e.g., metal chalcogenide having the multi-layered fullerene-like structure, tubular-like structure, spherical geometry structure, near spherical geometry structure, platelet like geometry or combination thereof, may be present in the water based industrial lubricant in amount ranging from 0.1 wt. % to 5 wt. % of the composition. In another example, the intercalation nanoparticles, e.g., metal chalcogenide having the multi-layered fullerene-like structure, tubular-like structure, platelet like geometry or combination thereof, may be present in the water based industrial lubricant in amount ranging from 0.2 wt. % to 1 wt. % of the composition. In further examples, the intercalation nanoparticles, e.g., metal chalcogenide having the multi-layered fullerene-like structure, tubular-like structure, platelet like geometry or combination thereof, may be present in an amount equal to 0.1 wt. %, 0.2 wt. %, 0.3 wt. %, 0.4 wt. %, 0.5 wt. %, 0.6 wt. %, 0.7 wt. %, 0.8 wt. %, 0.9 wt. %, 1 wt. %, 1.1 wt. %, 1.2 wt. %, 1.3 wt. %, 1.4 wt. %, 1.5 wt. %, 1.6 wt. %, 1.7 wt. %, 1.8 wt. %, 1.9 wt. % and 2.0 wt. %, and any range including an upper limit value and a maximum limit value provided by any of the above examples. The ratio of the water base to the intercalation nanoparticles, e.g., multi-layered fullerene-like structure, tubular-like structure, platelet like geometry or combination thereof is in the range of about 1:1.5 to about 48:1.

Figure 7:
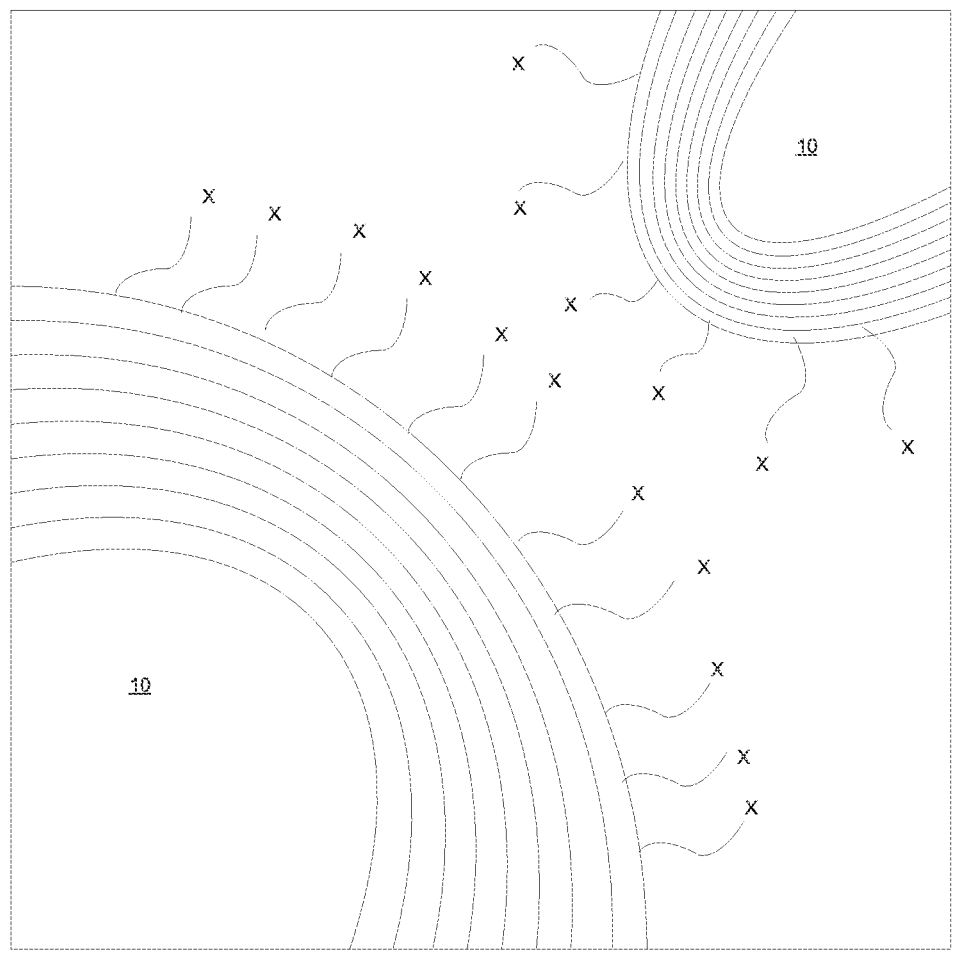
FIG. 7 is an illustration depicting an intercalation nanoparticles of a metal chalcogenide having a fullerene-like geometry, in which the dispersant has reacted with and encapsulates with the outer layers of the intercalation nanoparticle to provide that the intercalation nanoparticles have a surface charged with a repulsive force that substantially eliminates agglomeration of the intercalation nanoparticles in the dispersion, in accordance with one embodiment of the present disclosure.

The intercalation nanoparticles typically have an outer surface that has been functionalized by the dispersant. For example, the dispersant, which is at least partially soluble in water and includes a polar functional group, provides that the surface of the intercalation nanoparticles has a charge that produces a repulsive force from any adjacent intercalation nanoparticle, as depicted in FIG. 7. In FIG. 7, the intercalation nanoparticles identified by reference number 10 include an outer surface layer that has been functionalized by a dispersant/surfactant having a tail portion with a polar functional group X. As used herein, the term "polar functional group" denotes a group having an affinity to water and are usually charged or have polar side groups in their structure. Examples of polar function groups X that may be suitable for functionalizing the outer layer of the intercalation nanoparticles 10 include hydroxyl groups, carbonyl groups, carboxyl groups, amino groups, sulfhydryl groups, phosphate groups, in addition to various hydrophylic linkages, such as ethers (i.e., C—O—C), esters linkages (as found holding together fats, i.e., triglycerides), phosphodiester linkages (nucleic acids), glycolytic linkages (disaccharides and polysaccharides), and peptide bonds (polypeptides/proteins). Along with creating repulsive force between particles, i.e., intercalation nanoparticles 10, to prevent agglomeration, the tail part of the surfactant/dispersant also play several other roles such as it helps to disperse and suspend the intercalation nanoparticles 10 in media, i.e., the water base.

One embodiment of a dispersant that is suitable for use with the present disclosure includes an ethoxylated phosphate ester containing compound. In some examples, the ethoxylated phosphate ester containing compound that provides the dispersant may include at least one of polyoxyethylene nonylphenyl ether phosphate, polyethylene glycol branched nonylphenyl ether phosphates, polyoxyethylene tridecyl phosphate ester, complex alkyl phosphate ester, and a combination thereof.

Another embodiment of a dispersant that is suitable for use with the present disclosure includes an isopropanol amine containing compound. In some examples, the isopropanol amine containing compound that provides the dispersant may include at least one of diisopropanolamine, triisopropanolamine, monoisopropanolamine and combinations thereof.

In yet another embodiment, the dispersant is an alkylalkonolamine containing compound. In some examples, the alkylalkonolamine containing compound that provides the dispersant may include at least one of dimethylethanolamine, N-methyldiethanolamine, monomethylethanolamine, butylethanolamine, aminomethylpropanol, bis-(hydroxyethyl) methylamine, N,N-dimethyl-2-(2-aminoethoxy)-ethanol and combinations thereof.

In yet an even further embodiment, the dispersant may be provided by an ethanolamine containing compound. For example, the ethanolamine containing compound that provides the dispersant may include monoethanolamine, diethanolamine, triethanolamine and combinations thereof.

It is noted that the above examples of dispersants have been provided for illustrative purposes only and are not intended to limit the present disclosure to only the above listed examples. Other dispersants/surfactants that can react with the intercalation nanoparticles 10 and can provide a tail portion with a polar functional group X, as depicted in FIG. 7 is suitable for use with the present disclosure.

In some embodiments, the water based industrial lubricant may also include a dispersed phase of a carbon containing material, such as carbon nanotubes, e.g., single wall carbon nanotubes (CNT) or multi-wall carbon nanotubes (SWNT), or graphitic materials, such as carbon black (CB), graphitic fibers, diamond like carbon (DLC) and graphite platelets.

In another aspect of the present disclosure, a method of producing a water based dispersion is provided that begins with mixing the dispersant/surfactant (as described above) with the water base, wherein the dispersant is at least partially, or fully, water soluble and includes a polar functional group, e.g., a hydroxyl group ($OH^-$). Any of the aforementioned dispersants are suitable for use with this method including dispersants such as ethoxylated phosphate ester containing compound, isopropanol amine containing compound, isopropanol amine containing compound, alkylalkonolamine containing compound, an alkylalkonolamine containing compound, an ethanolamine containing compound and combinations thereof.

The dispersant/surfactant may be added to the water base in an amount ranging from 0.1 wt % to 50 wt. % of the intercalation nanoparticle, e.g., inorganic fullerene-like and/or tube-like particles, that is intended to be added to the mixture. For example, when functionalizing agent is an ethoxylated phosphate ester containing compound, such as polyoxyethylene nonylphenyl ether phosphate, the minimum functionalizing agent would be 0.1 g for 1 gram of intercalation nanoparticle (inorganic fullerene-like and/or tube-like particles) having the molecular formula $MX_2$, e.g. 1 gram of fullerene-like tungsten disulfide ($WS_2$), in 100 grams of the fluid medium, e.g., the water base.

In a following process step, the intercalation nanoparticle of a metal chalcogenide having a fullerene-like geometry, a tubular-like geometry, spherical geometry, near spherical geometry, or a combination thereof may be added to the mixture of the water base and the dispersant to provide that the dispersant reacts and encapsulates with the outer layers of the intercalation nanoparticle to provide that the intercalation nanoparticles have a surface charged which creates a repulsive force between adjacent particles and maintains inter-particle distance that substantially eliminates agglomeration of the intercalation nanoparticles in the dispersion.

It is noted that the intercalation nanoparticles as added to the mixture of the water base and the dispersant start as an aggregate of particles having their primary size. An "aggregate" is a combination of primary particles that have agglomerated. In some embodiments, agglomerates of the inorganic fullerene-like and/or tube-like particles, intercalation nanoparticles, having the molecular formula $MX_2$ are first mechanically broken down into their primary size, i.e., the size of the primary particles prior to agglomeration.

The mechanical reduction before the intercalation nanoparticles are added to the mixture of the water base and the dispersant, e.g., dry milling, or the mechanical reduction of the intercalation nanoparticles may be reduced in size after being mixed with the mixture of the dispersant and the water base, e.g., by wet milling or sonification. The following description describes the reduction of the particle size using wet methods, in which the aggregate intercalation nanoparticles are added to the mixture of the water base and dispersant and then reduced in particle size, e.g., reduced in particle size to substantially individual particles (which is referred to as the primary particle size).

In some embodiments, after the intercalation nanoparticle is added to the mixture of the water base and the dispersant, the mixture may be wet mixed, milled, and/or sonicated to reduce the aggregates of intercalation nanoparticle to substantially their primary particle size. In some embodiments, the milling process may begin with agglomerates having a particle size ranging from 5 microns to 20 microns. The particles size of the agglomerates may be reduced using a high-shear mixer, two or three roll mixers, homogenizers, bead mills, ultrasonic pulverizer and a combination thereof. A high-shear mixer disperses, or transports, one phase or ingredient (liquid, solid, gas) into a main continuous phase (liquid), with which it would normally be immiscible. A rotor or impellor, together with a stationary component known as a stator, or an array of rotors and stators, is used either in a tank containing the solution to be mixed, or in a pipe through which the solution passes, to create shear. In some embodiments, the high shear mixer may be a batch high-shear mixers, an inline powder induction, a high-shear granulator, an ultra-high-shear inline mixers and a combinations thereof. The particle size of the agglomerates may also be reduced using a sonicator.

Other means for reducing the particle size of the agglomerates to the primary particle size of the inorganic fullerene-like and/or tube-like particles having the molecular formula $MX_2$ include an attritor, agitator, ball mill, bead mill, basket mill, colloid mill, high speed disperser, edge runner, jar mill, low speed paddle mixer, variable speed mixer, paste mixer, ribbon blender, pug mixer, nauta mixer, sand/perl mill, triple roll mill, two roll mill, planetary mixer, slow speed mixer, high speed mixer, twin shaft mixer, multi shaft mixer, sigma kneader, rotor-stator mixer, homogenizer/emulsifier, high shear mixer, conical blender, V-blender, double cone blender, suspended mixer and combinations thereof. The mixing may be performed at room temperature or at an elevated temperature.

In some embodiments, the fluid medium for the lubricant is mixed with the inorganic fullerene-like and/or tube-like particles having the molecular formula $MX_2$ during the milling step in which the agglomerates of the inorganic fullerene-like and/or tube-like particles having the molecular formula $MX_2$ are mechanically broken down into their primary size. The inorganic fullerene-like and/or tube-like particles having the molecular formula $MX_2$ may be mixed with the fluid medium in an amount ranging from 0.1% to 60% by volume. In another embodiment, the inorganic fullerene-like and/or tube-like particles having the molecular formula $MX_2$ may be mixed with the fluid medium in an amount ranging from 0.5% to 40% by volume. In yet another embodiment, the inorganic fullerene-like and/or tube-like particles having the molecular formula $MX_2$ may be mixed with the fluid medium in an amount ranging from 0.5% to 20% by volume.

In some embodiments, the agglomerates of the intercalation nanoparticle, i.e., inorganic fullerene-like and/or tube-like particles, having the molecular formula $MX_2$ is reduced during the milling step to a diameter ranging from 1 nm to 100 nm for fullerene like geometries. In another embodiment, the agglomerates of the intercalation nanoparticle, i.e., inorganic fullerene-like and/or tube-like particles, having the molecular formula $MX_2$ is reduced during the milling step to a diameter ranging from 10 nm to 90 nm for fullerene like geometries. In yet another embodiment, the agglomerates of the inorganic fullerene-like and/or tube-like particles having the molecular formula $MX_2$ is reduced during the milling step to a diameter ranging from 30 nm to 50 nm for fullerene like geometries. Following milling, the inorganic fullerene-like and/or tube-like particles having the inorganic fullerene like geometry may have a diameter that is any value within the above ranges. It is noted that the above dimensions are provided for illustrative purposes only, and are not intended to limit the present disclosure. In one embodiment, milling reduces the intercalation nanoparticle to a particle size ranging from 5 nm to 999 nm.

The surfactant/dispersant applied to the mixture of the water based medium and the intercalation nanoparticle, i.e., inorganic fullerene-like and/or tube-like particles, having the molecular formula $MX_2$ provide dispersions of intercalation nanoparticles do not agglomerate or settle for a period of time that may range from 3 hours to 5 years. In another embodiment, the surfactant/dispersant applied to the mixture of the fluid medium and the inorganic fullerene-like and/or tube-like particles having the molecular formula $MX_2$ provide dispersions that do not agglomerate or settle for a period of time that may range from 5 hours to 3 years. In yet another embodiment, the surfactant/dispersant applied to the mixture of the fluid medium and the inorganic fullerene-like and/or tube-like particles having the molecular formula $MX_2$ provide dispersions that do not agglomerate or settle for a period of time that may range from 24 hours to 1 year.

Figure 8:
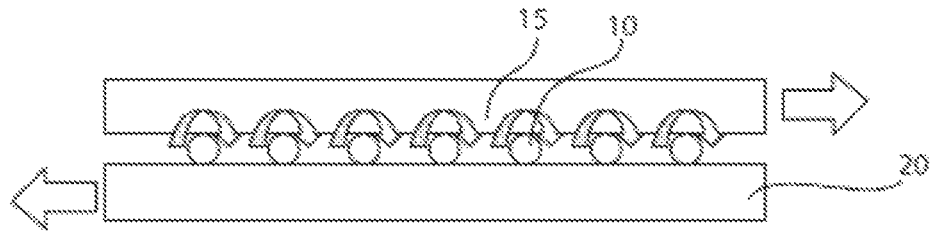
FIG. 8 is a pictorial view depicting an intercalation compound that is in simultaneous contact with two surfaces being lubricated by a rolling action of the intercalation compound, in accordance with one embodiment of the present disclosure.

Some aspects of the functionality of the water based industrial lubricant composition is described with reference to FIGS. 8-10. FIG. 8 depicts how the sphere geometry of one embodiment of the intercalation nanoparticles 10, i.e., inorganic fullerene-like particles, having the molecular formula $MX_2$ provide roller effect when simultaneously in contract with opposing surfaces 15, 20 that are being lubricated. More specifically, the rolling action of the sphere geometry of the inorganic fullerene-like particles 10 provides a low friction sliding motion between the opposing surfaces 15, 20 being lubricated. The sphere geometry of the inorganic fullerene-like particles 10 acts as an anti-friction agent enhancing the effectiveness of the fluid lubricant. The column shape of the tube-like particles having the molecular formula $MX_2$ provide a roller effect similar to the performance that is provided by the sphere geometry of the inorganic fullerene-like particles 10.

Figure 9:
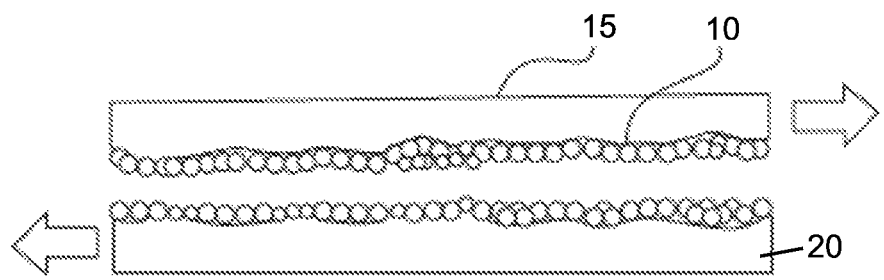
FIG. 9 is a pictorial view depicting an intercalation compound that is in simultaneous contact with two surfaces being lubricated by a rolling action of the intercalation compound, in accordance with another embodiment of the present disclosure.
Figure 10:
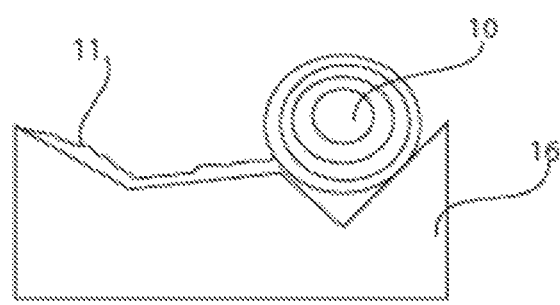
FIG. 10 is a pictorial view depicting a layer of the intercalation compound adhering to a surface that is being lubricated by the intercalation compound, in accordance with one embodiment of the present disclosure.

FIGS. 9 and 10 further depict a surface reconditioning effect that is provided by the lubricant including the fluid medium containing the inorganic fullerene-like and/or tube-like particles 10 having the molecular formula $MX_2$ and the functionalizing agent. More specifically, the inorganic fullerene-like and/or tube-like particles 10 having the molecular formula $MX_2$ are layered structures, in which when the exterior layers contact the surface being lubricated, the exterior layer 11 peels (also referred to as exfoliates) from the inorganic fullerene-like and/or tube-like particles and adheres to the surface 16 being lubricated, as depicted in FIG. 10. An inorganic fullerene-like and/or tube-like particle of tungsten disulfide ($WS_2$) may have alternating layers of tungsten (W) and sulfur (S). An inorganic fullerene-like and/or tube-like particle of molybdenum disulfide ($MoS_2$) may have alternating layers of molybdenum (Mo) and sulfur (S). One molybdenum (Mo) atom is sandwiched between two hexagonally packed sulfur atoms. The bonding between Mo and two S is covalent, however the bonding between each $MoS_2$ sandwich is week (Vander Waals). In this manner, the inorganic fullerene-like and/or tube-like particles having the molecular formula $MX_2$, such as molybdenum disulfide ($MoS_2$) and tungsten disulfide ($WS_2$), can deposit a metal-chalcogen (metal-sulfide for example) layer, such as molybdenum ($MoS_2$) or tungsten ($WS_2$), on the eroded surface being lubricated. Therefore, the inorganic fullerene-like and/or tube-like particle can recondition eroded surfaces, i.e., smooth rough and damaged surfaces, and lubricate to protect from additional wear. In some embodiments, the hollow feature of the inorganic fullerene-like and/or tube-like particle provides enhanced impact resistance.

Figure 11:
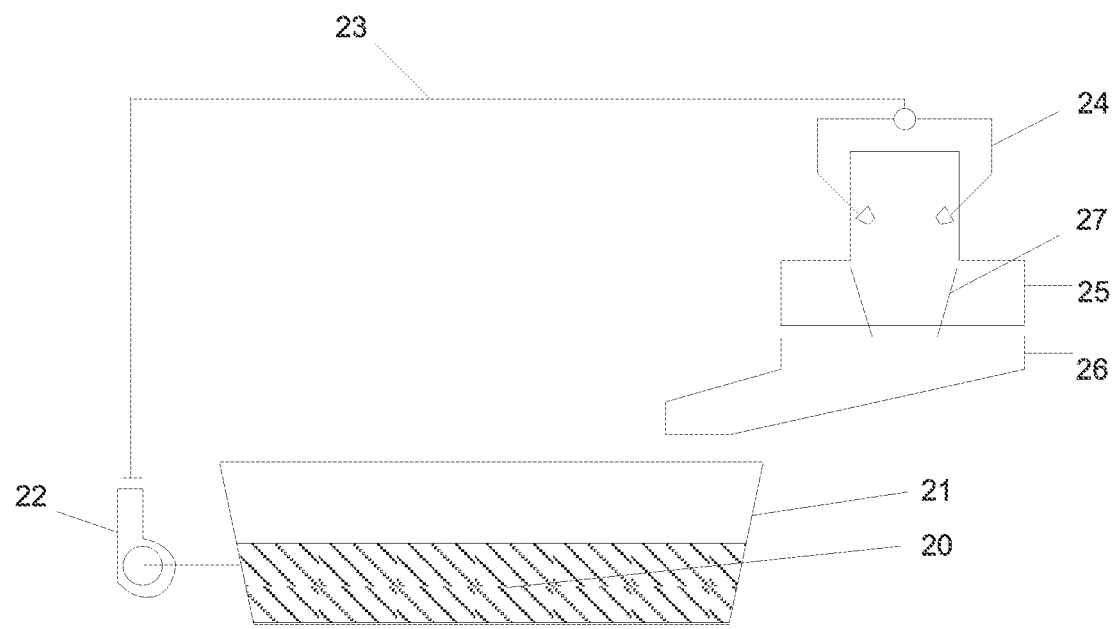
FIG. 11 is a schematic of a system for applying the industrial lubricant to a metal working apparatus, in accordance with one embodiment of the present disclosure.

Referring to FIG. 11, in another aspect of the present disclosure, an industrial lubrication method is provided that includes providing a metal substrate and applying an industrial lubricant composition 20 to the metal substrate. The industrial lubricant composition 20 has been described in detail above. For example, the industrial lubricant composition is provided that includes an water base and at least one intercalation nanoparticle of a metal chalcogenide in dispersion, wherein the intercalation compound is surface treated with a dispersant that is at least partially water soluble and includes a polar functional group. The intercalation nanoparticle may have a geometry that is a platelet shaped geometry, a spherical shaped geometry, a multi-layered fullerene-like geometry, a tubular-like geometry or a combination thereof.

In some embodiments, the industrial lubricant 20 may be applied to a metal substrate prior to being worked by a machine tool 25 that provides a metal working function. The metal substrate may be a preformed blank shape for threading, metal sheet, metal plate, or a combination thereof. The metal substrate may be comprises of steel, stainless steel, aluminum, copper, brass, titanium, platinum, iron, cast iron, nickel or an alloy or combination thereof.

The metal tool 25 that is depicted in FIG. 11 may work the metal substrate by cutting, chip, burning, drilling turning, milling, grinding, sawing, threading, filing, drawing, deep drawing, forming, necking, stamping, planning, rabbeting, routing, broaching or a combination thereof.

Applying of the industrial lubricant composition 20 may include flooding, spraying, dripping, misting, brushing, through-tool coolant systems, or a combination thereof. In the example that is depicted in FIG. 11, the industrial lubricant composition 20 may be applied using a spray and/or mist applicator 24. The spray and/or mist applicator 24 may be connected to a reservoir 21 for containing the industrial lubricant composition 20. A pump 22 may transport the industrial lubricant 20 from the reservoir 21 across at least one line 23 to the spray and/or mist applicator 24. In some embodiments, the metal tool 25 may include a return 26 for returning the excess industrial lubricant that spills from the metal tool and/or metal substrate, e.g., shedding industrial lubricant 27, to the reservoir 21.

Although the industrial lubricant has been depicted in FIG. 11 as being applied in metal working applications, the industrial lubricant composition of the present disclosure is not limited to only this application. For example, the industrial lubricant may also be employed as a gear oil, hydraulic oil, turbine oil or a combination thereof.

The compositions and methods disclosed herein provide very low wear of contacting components, protection of tools, i.e., extends tool lifetime, excellent ultra pressure protection, and the prevention of welding of the work pieces. The compositions and methods disclosed herein also provide excellent cooling and lubrication in metal working applications to provide high quality surface finishes. In some embodiments, the lubricant compositions disclosed herein are suitable for a number of metals, are easily removed, rapidly dissipate heat, have a mild-non-offensive odor and will not smoke. Further, in some embodiments, the lubricant compositions that are disclosed herein do not stain steel, copper, brass or bronze materials, or alloys thereof.

In some examples, the industrial lubricant may be employed as a metal working fluid, gear (hygroscopic) oil, hydraulic (hygroscopic) oil, turbine (hygroscopic) oil or a combination thereof.

A lubricant's performance characteristics are often measured in terms of Falex Pin-on Vee block test, four-ball EP LWI (Extreme Pressure Load Wear Index), four-ball Weld Point, four-ball ISL (Initial Seizure Load).

The Falex Pin and Vee Block test method consists of running a rotating steel journal at 290 plus or minus 10 rpm against two stationary V-blocks immersed in the lubricant sample. Load (pound-force) is applied to the V-blocks by a ratchet mechanism. Increasing load is applied continuously until failure. The fail load value obtained serves to differentiate fluids having low, medium and high level extreme pressure properties. In some embodiments, the industrial lubricant compositions disclosed herein can impart a Falex Pin-on-Vee block test fail load of 1800 lbs or greater, and in some examples at least 4000 lbs., preferably 4150 lbs.

In some embodiments, the industrial lubricant composition that is disclosed herein has an enhanced extreme pressure level, as measured using four-ball test extreme pressure (last non-seizure load) testing. As used herein, the phrase "four-ball test extreme pressure (last non-seizure load)" or "four-ball weld point" refers to the lowest applied load, in kilogram-force, at which the rotating ball seizes and then welds to the three stationary balls. This indicates that the extreme pressure level of the lubricant has been exceeded (ASTM D2783). The test indicates levels stepwise, at 80, 100, 160, 200, 250, 315, 400, 500, 620, and 800. A high performance metalworking lubricant as defined here is one that has a weld point of at least 620 kg, preferably 800 kg or exceeding 800 kg (800+).

In some embodiments, the industrial lubricant composition that is disclosed herein has improved wear preventative properties, as measured using four-ball wear testing. The term "four-ball wear test" is a test method used to determine the relative wear preventive properties of lubricating fluids in sliding contact under the prescribed test conditions, in accordance with ASTM D4172. In some embodiments, a 4-ball anti-wear test including a 40 kg load for 1 hour at 1200 rpm applied to a metal surface lubricated with the composition at elevated temperature, i.e., 75° C., in accordance with the present disclosure provided a value of 1 mm or less.

The lubricant compositions disclosed herein are also characterized using four ball coefficient of friction (COF) measurements. The water based lubricant compositions disclosed herein had a measured coefficient of friction performance of 0.095 or less. For example, a 0.2% IF-$WS_2$ dispersion produced a coefficient of friction performance of 0.092 or less. In another example, a 0.3% IF-$WS_2$ dispersion produced a coefficient of friction performance of 0.083 or less. In yet another example, a 0.5% IF-$WS_2$ dispersion produced a coefficient of friction performance of 0.067 or less.

It is noted that the addition of the metal chalcogenide intercalation nanoparticles described herein, e.g., having a multi-layered fullerene-like structure, spherical geometry, near spherical geometry, tubular-like structure, platelet like geometry or combination thereof, improves the heat transfer properties of water by approximately 20%. This makes the water dispersions compositions disclosed herein not only good processing fluids for metal working applications, but also suitable for cooling applications. This provides that the water dispersion compositions disclosed herein can be used under high pressure, high speed and high temperature.

A lubricant composition with "good stability" as used herein refers to a homogenous composition that will not show any sign of separation, change in color or clarity for a sustained period typically at least one and preferably at least three or at least six months.

The following examples are provided to further illustrate the present invention and demonstrate some advantages that arise therefrom. It is not intended that the invention be limited to the specific examples disclosed.

EXAMPLES

Industrial lubricant compositions were prepared in accordance with the present disclosure, the compositions of which are listed in Table 1, below.

TABLE 1

TEST SPECIMEN AND CHARACTERIZATION.

| IF-WS$_2$ particles in water dispersion, (wt %) | 4 ball EP, weld load (kg) (ASTM D2783) | 4 ball wear (mm) (ASTM D4172) | Four ball CoF | Falex Pin-on-Vee (lb) (ASTM D3233A) |
|---|---|---|---|---|
| 0.2 | 160 | 0.79 | 0.092 | 1800 |
| 0.3 | 250 | 0.77 | 0.083 | |
| 0.5 | 400 | 0.57 | 0.067 | |
| 1 | 620 | — | — | 4150 |
| 1.3 | 800 | — | — | |
| 1.5 | 1000 | — | — | |

Figure 12:
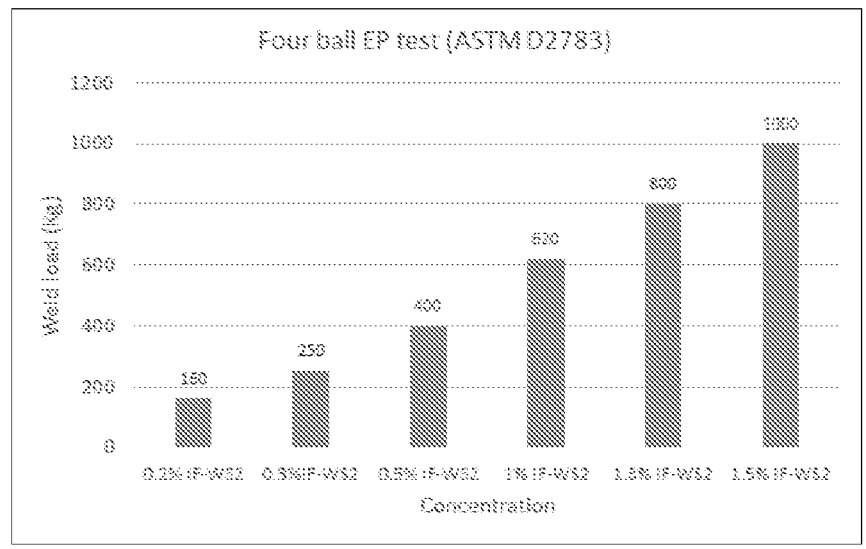
FIG. 12 is a plot of four ball extreme pressure (EP) weld performance for water based lubricant compositions, in accordance with one embodiment of the present disclosure.
Figure 13:
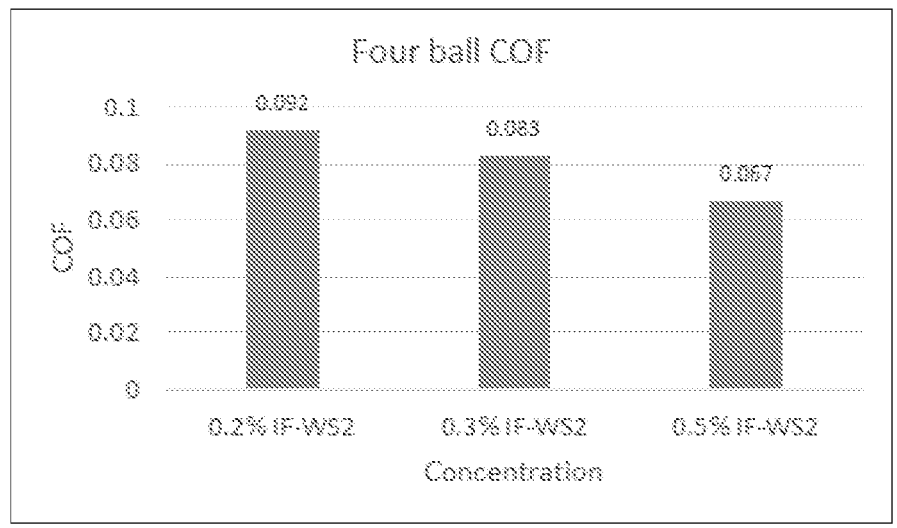
FIG. 13 is a plot of coefficient of friction (CoF) for water based lubricant compositions, in accordance with one embodiment of the present disclosure.
Figure 14:
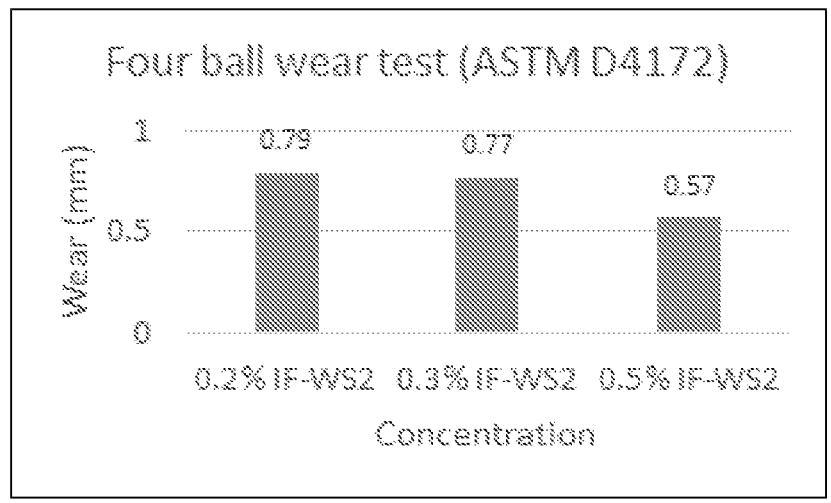
FIG. 14 is a plot of four ball wear performance for water based lubricant compositions, in accordance with one embodiment of the present disclosure.
Figure 15:
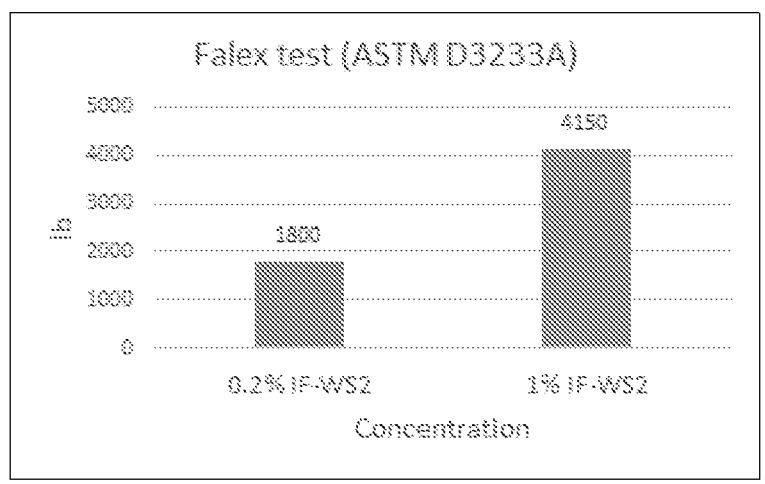
FIG. 15 is a plot of Falex Pin-on-Vee Block test for water based lubricant compositions, in accordance with one embodiment of the present disclosure.

FIG. 12 is a plot of four ball extreme pressure (EP) weld performance for water based lubricant compositions as listed in Table 1. FIG. 13 is a plot of coefficient of friction (CoF) for water based lubricant compositions as listed in Table 1. FIG. 14 is a plot of four ball wear performance for water based lubricant compositions as listed in Table 1. FIG. 15 is a plot of Falex Pin-on-Vee Block test for water based lubricant compositions listed in Table 1.

It is further noted that the water based lubricant composition of 0.75 (0.3% of IF-WS2 particles)("Test Sample") listed in Table 1 was also analyzed for heat transfer properties. For example, the average thermal conductivity (W m$^{-1}$K$^{-1}$) for the test sample was 0.727 with a standard deviation of 0.030 for the testing. In comparison, the average thermal conductivity (W m$^{-1}$K$^{-1}$) for the distilled water was 0.610 with a standard deviation of 0.010 for the testing.

While the claimed methods and structures has been particularly shown and described with respect to preferred embodiments thereof, it will be understood by those skilled in the art that the foregoing and other changes in form and details may be made therein without departing from the spirit and scope of the presently claimed methods and structures.

What is claimed is:

1. A water based dispersion of nanoparticles comprising:
a water base; and
at least one intercalation nanoparticle of molybdenum disulfide (MoS$_2$) or tungsten disulfide (WS$_2$) or a combination thereof in dispersion in said water base, wherein the at least one intercalation nanoparticle has geometry that includes at least one of fullerene-like particles, tubular-like particles and combinations thereof, wherein the intercalation nanoparticle is surface treated with a dispersant that is at least partially or fully water soluble and includes a polar functional group.

2. The water based dispersion of claim 1, wherein the dispersant is a ethoxylated phosphate ester selected from the group consisting of polyoxyethylene nonylphenyl ether phosphate, polyethylene glycol branched nonylphenyl ether phosphates, polyoxyethylene tridecyl phosphate ester, complex alkyl phosphate ester, and a combination thereof.

3. The water based dispersion of claim 1, wherein the dispersant is an isopropanol amine selected from the group consisting of diisopropanolamine, triisopropanolamine, monoisopropanolamine and combinations thereof.

4. The water based dispersion of claim 1, wherein the dispersant is an alkylalkonolamine selected from the group consisting of dimethylethanolamine, N-methyldiethanolamine, monomethylethanolamine, butylethanolamine, aminomethylpropanol, bis-(hydroxyethyl)methylamine, N,N-dimethyl-2-(2-aminoethoxy)-ethanol and combinations thereof.

5. The water based dispersion of claim 1, wherein the dispersant comprises an ethanolamine selected from the group consisting of monoethanolamine, diethanolamine, triethanolamine and combinations thereof.

6. An industrial lubrication method comprising:
providing a metal substrate;
applying an industrial lubricant composition to the metal substrate, the industrial lubricant comprising a water base and at least one intercalation compound of molybdenum disulfide (MoS$_2$) or tungsten disulfide (WS$_2$) or a combination thereof in a dispersion with said water base, wherein the at least one intercalation nanoparticle has a geometry that includes at least one of fullerene-like particles, and tubular-like particles, wherein the intercalation nanoparticle is surface treated with a dispersant that is at least partially water soluble and includes a polar functional group; and
working the metal substrate.

7. The method of claim 6, wherein said working comprises cutting, chip, burning, drilling turning, milling, grinding, sawing, threading, filing, drawing, forming, necking, stamping, planning, rabbeting, routing, broaching or a combination thereof.

8. The method of claim 6, wherein the dispersant is an ethoxylated phosphate ester selected from the group consisting of polyoxyethylene nonylphenyl ether phosphate, polyethylene glycol branched nonylphenyl ether phosphates, polyoxyethylene tridecyl phosphate ester, complex alkyl phosphate ester, and a combination thereof, or the dispersant is an isopropanol amine selected from the group consisting of diisopropanolamine, triisopropanolamine, monoisopropanolamine and combinations thereof, or the dispersant is an alkylalkonolamine selected from the group consisting of dimethylethanolamine, N-methyldiethanolamine, monomethylethanolamine, butylethanolamine, aminomethylpropanol, bis-(hydroxyethyl)methylamine, N,N-dimethyl-2-(2-aminoethoxy)-ethanol and combinations thereof, or the dispersant comprises an ethanolamine selected from the group consisting of monoethanolamine, diethanolamine, triethanolamine and combinations thereof.

9. A method of producing a water based dispersion comprising:
mixing a dispersant with a water base, wherein the dispersant is at least partially water soluble and includes a polar functional group; and
mixing an intercalation nanoparticle of a molybdenum disulfide (MoS$_2$) or tungsten disulfide (WS$_2$) or a combination thereof having a fullerene-like geometry, a tubular-like geometry or combination thereof, to the mixture of the water base and the dispersant to provide that the dispersant reacts and encapsulates with the outer layers of the intercalation nanoparticle to provide that the intercalation nanoparticles have a surface charged with a repulsive force that substantially eliminates agglomeration of the intercalation nanoparticles in the dispersion.

10. The method of claim 9, wherein the dispersant is a ethoxylated phosphate ester selected from the group consisting of polyoxyethylene nonylphenyl ether phosphate, polyethylene glycol branched nonylphenyl ether phosphates, polyoxyethylene tridecyl phosphate ester, complex alkyl phosphate ester, and a combination thereof, or the dispersant is an isopropanol amine selected from the group consisting of diisopropanolamine, triisopropanolamine, monoisopropanolamine and combinations thereof, or the dispersant is an alkylalkonolamine selected from the group consisting of dimethylethanolamine, N-methyldiethanolamine, monomethylethanolamine, butylethanolamine, aminomethylpropanol, bis-(hydroxyethyl)methylamine, N,N-dimethyl-2-(2-aminoethoxy)-ethanol and combinations thereof, or the dispersant comprises an ethanolamine selected from the group consisting of monoethanolamine, diethanolamine, triethanolamine and combinations thereof.

11. The method of claim 9, wherein the mixing of the intercalation nanoparticle with the mixture of the water base and the dispersant comprises bead milling, high shear mixture, ultra sonication or high pressure homogenization.

\* \* \* \* \*